(12) United States Patent
Takada et al.

(10) Patent No.: US 8,607,851 B2
(45) Date of Patent: Dec. 17, 2013

(54) TOTAL HEAT EXCHANGING ELEMENT AND TOTAL HEAT EXCHANGER

(75) Inventors: Masaru Takada, Tokyo (JP); Hidemoto Arai, Tokyo (JP); Takanori Imai, Tokyo (JP); Yoichi Sugiyama, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 24 days.

(21) Appl. No.: 13/006,009

(22) Filed: Jan. 13, 2011

(65) Prior Publication Data

US 2011/0108256 A1     May 12, 2011

Related U.S. Application Data

(62) Division of application No. 11/885,449, filed as application No. PCT/JP2006/319807 on Oct. 3, 2006.

(51) Int. Cl.
*F28F 3/00* (2006.01)
(52) U.S. Cl.
USPC .......................................................... 165/166
(58) Field of Classification Search
USPC .......................................................... 165/166
See application file for complete search history.

(56) References Cited

U.S. PATENT DOCUMENTS

| | | | |
|---|---|---|---|
| 4,582,129 A * | 4/1986 | Yano et al. | ........................ 96/118 |
| 4,588,025 A * | 5/1986 | Imai et al. | ........................ 165/133 |
| 4,871,607 A | 10/1989 | Kuma et al. | |
| 5,505,769 A | 4/1996 | Dinnage et al. | |
| 5,580,370 A | 12/1996 | Kuma et al. | |
| 6,536,514 B1 | 3/2003 | Sugiyama et al. | |
| 7,470,311 B2 * | 12/2008 | Sueoka et al. | ................... 96/129 |
| 2002/0040575 A1 | 4/2002 | Okano et al. | |
| 2003/0094269 A1 * | 5/2003 | Arai et al. | ....................... 165/166 |
| 2003/0226656 A1 | 12/2003 | Harada et al. | |
| 2005/0082045 A1 | 4/2005 | Takada et al. | |
| 2007/0095513 A1 | 5/2007 | Arai et al. | |
| 2008/0105418 A1 | 5/2008 | Takada et al. | |

FOREIGN PATENT DOCUMENTS

| | | |
|---|---|---|
| CN | 1463315 | 12/2003 |
| CN | 1607371 | 4/2005 |
| DE | 195 25 227 A1 | 1/1997 |
| EP | 1 052 458 A2 | 11/2000 |
| EP | 1 818 642 A1 | 8/2007 |

(Continued)

OTHER PUBLICATIONS

English Abstract of JP57115696A, 1-2.*

(Continued)

*Primary Examiner* — Brandon M Rosati
(74) *Attorney, Agent, or Firm* — Buchanan Ingersoll & Rooney PC

(57) ABSTRACT

A total heat exchanging element includes a partitioning component to which a water-soluble moisture-absorbing agent has been added that is a component partitioning between a first laminar air-flow path and a second laminar air-flow path that are layered; a spacing component that forms the first laminar air-flow path and the second laminar air-flow path and maintains a space between adjacent partitioning components; and an adhesive agent that adheres the partitioning component and the spacing component. The adhesive agent is a water-solvent-type adhesive agent impregnated with a water-soluble moisture-absorbing agent. The partitioning component and the spacing component are made from a liquid-absorbing material that absorbs water and substances dissolved in the water.

14 Claims, 5 Drawing Sheets

(56) References Cited

FOREIGN PATENT DOCUMENTS

| | | | |
|---|---|---|---|
| JP | 57115696 A * | 7/1982 | |
| JP | 58-132545 A | 8/1983 | |
| JP | 5-309771 A | 11/1993 | |
| JP | 10-153398 A | 6/1998 | |
| JP | 2829356 B2 | 9/1998 | |
| JP | 3791726 | 7/1999 | |
| JP | 2001-027489 A | 1/2001 | |
| JP | 2002-310589 A | 10/2002 | |
| JP | 2003-148892 A | 5/2003 | |
| JP | 2003-251133 A | 9/2003 | |
| JP | 2002-24207 A | 1/2005 | |
| JP | 2005-121264 A | 5/2005 | |
| TW | 536578 | 6/2003 | |
| TW | 592826 | 6/2004 | |
| WO | WO 02/099193 A1 | 12/2002 | |

OTHER PUBLICATIONS

International Search Report for PCT/JP2006/319807 dated Oct. 26, 2006.

Taiwanese Office Action issued in Application No. 09820239990 dated Apr. 24, 2009.

European Search Report issued in Application 06811147.5 dated Aug. 16, 2010.

Office Action issued by the U.S. Patent and Trademark Office in the U.S. Appl. No. 11/885,449, mailed Jul. 10, 2013, U.S. Patent and Trademark Office, Alexandria VA. (13 pages).

* cited by examiner

TOTAL HEAT EXCHANGING ELEMENT AND TOTAL HEAT EXCHANGER

CROSS-REFERENCE TO RELATED APPLICATIONS

This application is a divisional of U.S. application Ser. No. 11/885,449 filed on Aug. 31, 2007, which is a U.S. national stage application of International Application No. PCT/JP2006/319807 filed on Oct. 3, 2006, the entire content of which is incorporated herein by reference.

TECHNICAL FIELD

The present invention relates to a total heat exchanging element and a total heat exchanger that is provided in an air-conditioner, a ventilator, or the like, and that performs total heat exchange of latent heat and sensible heat between two atmospheres having differing temperatures and humidity.

BACKGROUND ART

Conventionally, there is known a total heat exchanging element 10, such as that shown in FIG. 1, that includes a first laminar air-flow path 4, a second laminar air-flow path 5, a partitioning component 1, and a spacing component 2. The second laminar air-flow path 5 is layered on to the first laminar air-flow path 4 and it is perpendicular to the first laminar air-flow path 4. The partitioning component 1 partitions between the first air-flow path 4 and the second air-flow path 5. The spacing component 2 forms the first air-flow path 4 and the second air-flow path 5 and maintains a space between a lower one of the partitioning component 1 and an upper one of the partitioning component 1. A adhesive agent 3 adheres the partitioning component 1 to the spacing component 2. A first atmosphere 6 flows through the first laminar air-flow path 4 and a second atmosphere 7 flows through the second air-flow path 5. The total heat exchanging element 10 causes exchange of latent heat and sensible heat between the first atmosphere 6 and the second atmosphere 7, with the partitioning component 1 as a medium.

The partitioning component 1 acts as the medium for exchanging the latent heat and the sensible heat between the first atmosphere 6 and the second atmosphere 7. Therefore, heat transfer performance and moisture transmission performance of the partitioning component 1 significantly affect the exchange rates of the sensible heat and the latent heat. In view of costs, paper made from cellulose fiber (pulp) is generally used as a material for the spacing component 2.

To make the partitioning component 1 moisture permeable, a moisture-absorbing agent (moisture transmission agent) is generally added to the partitioning component 1. As the moisture-absorbing agent, alkali metal salts and alkali earth metal salts that are water-soluble moisture-absorbing agents are used. The alkali metal salts and alkali earth metal salts are represented by lithium chloride, calcium chloride, and the like. As non-water-soluble moisture-absorbing agents, powdered moisture-absorbing agents, such as silica gel, and strong acidic or strong basic ion-exchange resin, are used (for example, refer to Patent Documents 1, 2, and 3).

In the total heat exchanging element 10, a reduction in an amount of gas, such as $CO_2$, transmitted between the first atmosphere 6 and the second atmosphere 7 is particularly required. Therefore, in addition to the above-described moisture transmission (moisture-absorbing) performance, the partitioning component 1 is required to have higher gas-shielding property.

Various partitioning component materials having enhanced gas-shielding property have been proposed. For example, there have been proposed a material that is finely-ground pulp fiber (for example, refer to Patent Document 4), a material to which microfibrillared cellulose is added as filler that is made into paper (for example, refer to Patent Document 5), and a material of which pores are sealed by applying a water-soluble resin, such as polyvinyl alcohol, to a partitioning component (paper) surface (for example, refer to Patent Document 6).

Sometimes adhesion of the partitioning component 1 and the spacing component 2 on an edge of the total heat exchanging element 10 can be weak due to application of insufficient adhesive agent. If this happens, a gap is produced between both the sheets through which air, and $CO_2$ that mixes with air of other flow paths, leaks. It is required, therefore, to take measures so that such gaps are not produced. Moreover, to ensure fire safety, a flame-retardant agent or the like is sometimes added to the partitioning component 1 and the spacing component 2.

A water-solvent-type adhesive agent is mostly used as the adhesive agent used to adhere the partitioning component 1 and the spacing component 2, for following reasons. When an organic-solvent-type adhesive agent is used, diffusion of an organic solvent itself remaining in the adhesive agent, odor accompanying the diffusion and the like occurs. Therefore, a total heat exchanging element made of an organic-solvent-type adhesive agent is not suitable for use in an air-conditioner. In addition, complicated and expensive auxiliary machinery, such as a device for recovering the organic solvent, is required in a production facility of the total heat exchanging element 10, leading to increased costs.

Patent Document 1: Japanese Patent No. 2829356
Patent Document 2: Japanese Patent Application Laid-open No. H10-153398
Patent Document 3: Japanese Patent Application Laid-open No. 2003-251133
Patent Document 4: International Publication No. 2002/099193 Pamphlet
Patent Document 5: Japanese Patent No. 3791726
Patent Document 6: Japanese Patent Application Laid-open No. 2001-027489

DISCLOSURE OF INVENTION

Problem to be Solved by the Invention

However, in the total heat exchanging element 10 that includes the partitioning component 1 to which a water-soluble moisture-absorbing agent is added, the actual humidity exchange rate measured after the partitioning component 1 is included in the total heat exchange element 10 is lower in comparison with the humidity exchange rate predicted from a measurement result of the moisture transmission performance of only the partitioning component 10. Such a phenomenon does not occur in a partitioning component produced from a resin sheet or the like. This phenomenon typically occurs when a paper partitioning component 1, which is made from cellulose fiber to which the water-soluble moisture-absorbing agent has been added, is used.

When a cause of the phenomenon is examined, the following mechanism can be considered as a cause of the reduction in the actual humidity exchange rate. In other words, when the partitioning component 1 and the spacing component 2 are produced from a material having liquid-absorbency (in the present specifications, to differentiate "liquid-absorbency" from a property that selectively absorbs only water molecules, "liquid-absorbency" refers to a property that simultaneously absorbs dissolved substances dissolved among the water molecules with the water molecules. When a material absorbs water, for example, only the water molecules are chemically selected by a functional group or the like, adsorbed onto a material surface, and incorporated within. Alternatively, water including the dissolved substance is physically absorbed as in water absorption, by capillary attraction in a porous material. Alternatively, an aqueous solution including the dissolved substance, such as some super water-absorbent resins, are absorbed. A super water-absorbent resin is, for example, sodium acrylate copolymer. In the present specifications, "liquid-absorbency" refers to water absorption by the capillary attraction and water absorption of the aqueous solution) and the moisture-absorbing agent is the water-soluble moisture-absorbing agent, when the partitioning component 1 and the spacing component 2 are bonded by the application of the water-solvent-type adhesive agent, adhesion progresses while the partitioning component 1 and the spacing component 2 absorb water in the water-solvent-type adhesive agent. The partitioning component 1 and the spacing component 2 are adhesion-subject components.

At this process, the water-soluble moisture-absorbing agent added to the partitioning component 1 comes into contact with the water in the water-solvent-type adhesive agent, dissolves and simultaneously disperses throughout the water. As a result, the water-soluble moisture-absorbing agent spills from the partitioning component 1 into an area impregnated by the water-solvent-type adhesive agent and water from the spacing component 2. Because of such spillage, the amount of water-soluble moisture-absorbing agent within the partitioning component 1 decreases. Therefore, the actual humidity exchange rate of the total heat exchanging element 10 drops below the humidity exchange rate of only the partitioning component 1.

The humidity exchange rate is greatly affected in a low-humidity environment in which a moisture transmission performance enhancement effect caused by the addition of the water-soluble moisture-absorbing agent is particularly large. Concretely, the humidity exchange rate significantly declines in the low-humidity environment. As a result, not only do the humidity exchange rate and the total heat exchange rate deteriorate, a difference occurs between the humidity exchange rate and the total heat exchange rate in a high-humidity environment and in the low-humidity environment. Such difference indicates that the total heat exchange rate of the total heat exchanger changes depending on environment conditions of the atmosphere. As a result, calculations performed by a user of the total heat exchanger become difficult when calculating an annual amount of recovered heat, and accompanying estimations of an amount of conserved energy and the like. Therefore, the difference is not preferable to the user.

An experiment was conducted to confirm that the above-described phenomenon is actually occurring. The partitioning component 1 to which lithium chloride is added as the water-soluble moisture-absorbing agent and the spacing component 2 to which guanidine sulfamate is added as the flame-retardant agent were adhered by using a vinyl acetate emulsion adhesive that serves as the water-solvent-type adhesive agent, and distribution state of chloride ion in a cross-section of the adhesive area was observed through fluorescent X-ray analysis.

Observation results are shown in FIG. 2 and FIG. 3. Bright spots in these figures represent areas in which the water-soluble moisture-absorbing agent is distributed. It can be seen that the water-soluble moisture-absorbing agent is distributed not only within the partitioning component, but also to all corners of the spacing component. In other words, it can be said that the phenomenon such as that described above is actually occurring and that that deterioration of the humidity exchange rate is due to the occurrence of the phenomenon.

As a countermeasure against the phenomenon, initially, an attempt to prevent performance deterioration was made by adding the water-soluble moisture-absorbing agent in excess, equivalent to an amount that may spill, to the partitioning component 1. However, the amount of water-soluble moisture-absorbing agent that can be added to the partitioning component 1 is limited; because, the maximum possible amount of water-soluble moisture-absorbing agent is already added to enhance performance. In other words, further increase of the water-soluble moisture-absorbing agent is difficult.

On the other hand, if a large amount of water-soluble moisture-absorbing agent is added to the partitioning component 1, strength of the partitioning component 1 decreases. Such a partitioning component 1 absorbs moisture and softens during production of the total heat exchanging element 10 so that its manageability during production significantly deteriorates. In some instances, the total heat exchanging element 10 could not be produced.

Use of a non-water-soluble moisture-absorbing agent as the moisture-absorbing agent to be added to the partitioning component 1 can be considered. However, there is a problem in that, compared to the water-soluble moisture-absorbing agent, addition of the non-water-soluble moisture-absorbing agent to the partitioning component 1 requires complex process to be carried out, which leads to increase in the processing costs. On the other hands, if the organic-solvent-type adhesive agent, in which the water-soluble moisture-absorbing agent does not dissolve, is used to adhere the partitioning component 1 and the spacing component 2, volatile organic compounds (VOC), odors, and problems in terms of the production facility occur, as described above.

The present invention has been devised in light of the above explanation. An object of the present invention is to obtain a total heat exchanging element and a total heat exchanger that does not disperse organic solvents or odors, requires only a small-scale production facility, and has little spillage of the water-soluble moisture-absorbing agent from the partitioning component during element manufacturing.

Means for Solving Problem

To solve the above problems, and to achieve the above objects, a total heat exchanging element according to the present invention includes a partitioning component to which a water-soluble moisture-absorbing agent has been added that is a component partitioning between a first laminar air-flow path and a second laminar air-flow path that are layered; a spacing component that forms the first laminar air-flow path and the second laminar air-flow path and maintains a space between the partitioning components; and an adhesive agent that adheres the partitioning component and the spacing component, wherein the adhesive agent is a water-solvent-type adhesive agent impregnated with a water-soluble moisture-absorbing agent.

Effect of the Invention

In the total heat exchanging element according to the present invention, when the water-solvent-type adhesive agent is adhered to the partitioning component during the manufacturing process, the water-soluble moisture-absorbing agent spills into the water-solvent-type adhesive agent from the partitioning component. However, the water-solvent-type adhesive agent is impregnated with the water-soluble moisture-absorbing agent. Therefore, the water-soluble moisture-absorbing agent conversely impregnates the partitioning section from the water-solvent-type adhesive agent and cancels the spillage of the water-soluble moisture-absorbing agent from the partitioning component. Moisture-absorbing performance of the total heat exchanging element is not deteriorated.

The water-solvent-type adhesive agent is impregnated with the water-soluble moisture-absorbing agent. The adhesive area (adhesive agent) of the partitioning component and the spacing component has moisture-permeability (moisture-absorbency). Therefore, this is equivalent to increasing a humidity exchange area of the partitioning component. The humidity exchange rate and the total heat exchange rate are enhanced.

Furthermore, the adhesive agent itself has moisture-permeability. Therefore, the moisture transmission performance of the total heat exchanging element does not deteriorate even when the amount of applied adhesive agent is increased. By the increase in the amount of applied adhesive agent, adhesion reliability of the partitioning component and the spacing component is enhanced, and durability of the element itself is improved. Gaps in the adhesive area are sealed, and $CO_2$ transmission amount decreases.

Figure 1:
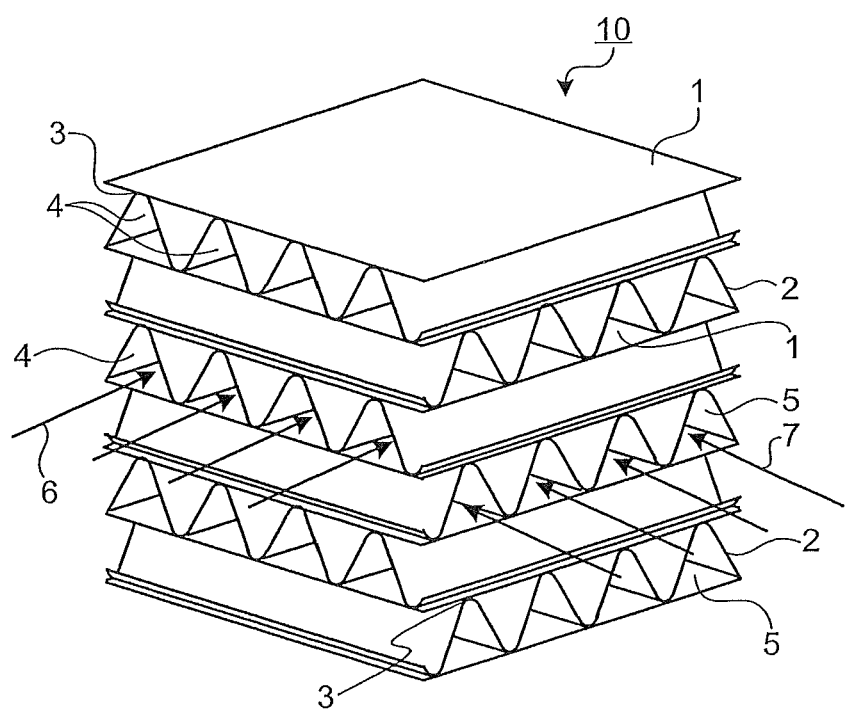
FIG. 1 is a perspective view of a structure of a conventional total heat exchanging element which is also a total heat exchanging element of the present invention.
Figure 2:
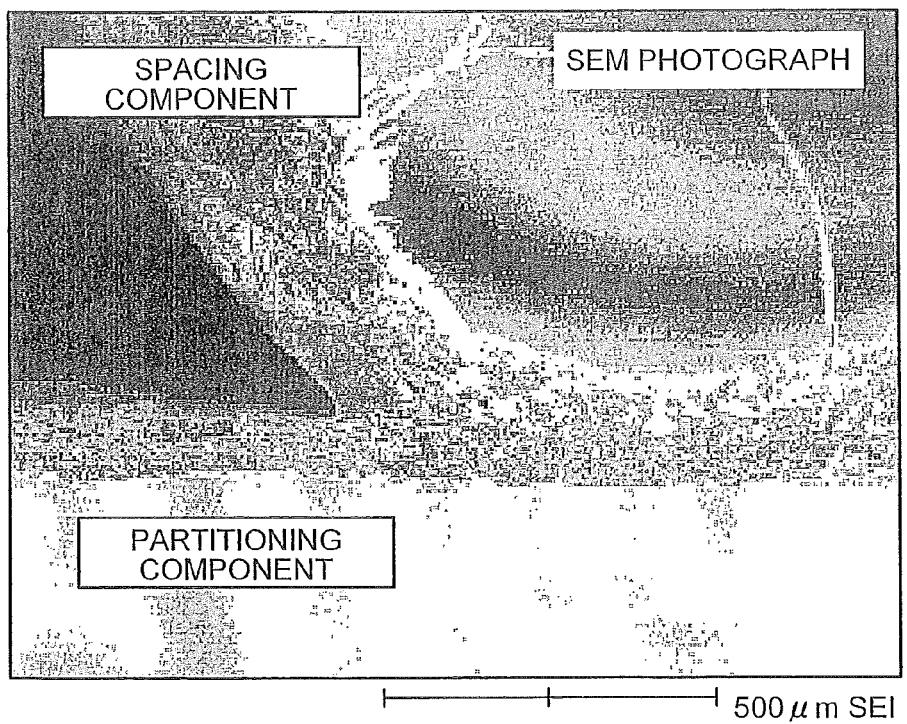
FIG. 2 is a scanning electron microscopy (SEM) photograph of an adhesive area cross-section of conventional partitioning component and spacing component.
Figure 3:
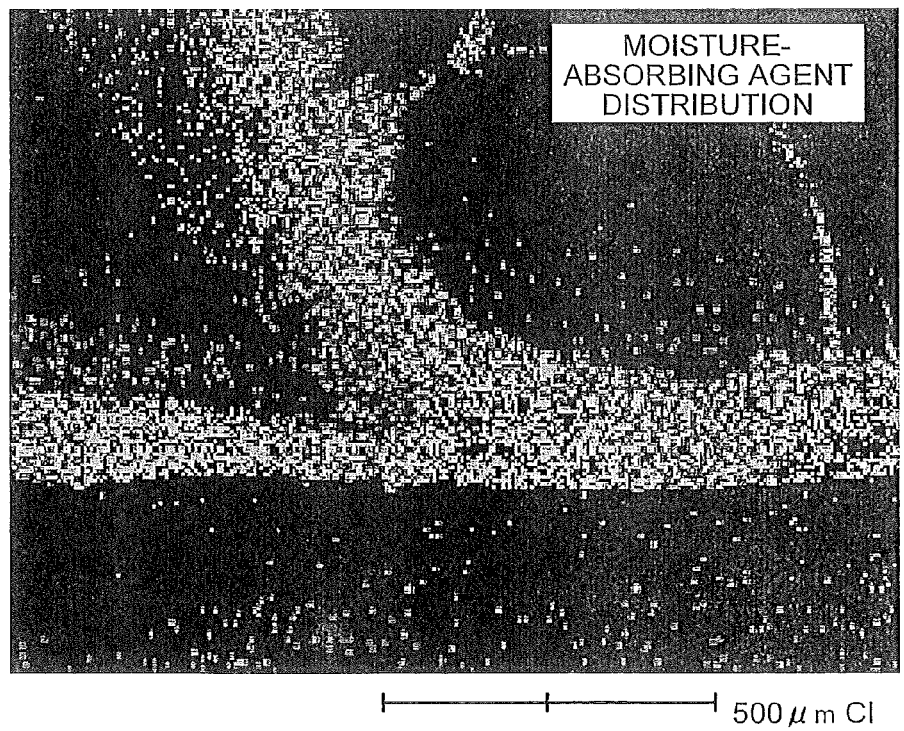
FIG. 3 is photograph that shown moisture-absorbing agent distribution by fluorescent X-ray analysis of the adhesive area cross-section of the conventional partitioning component and spacing component.

EXPLANATIONS OF LETTERS OR NUMERALS 1 and 21: partitioning component
2: spacing component
3 and 23: adhesive agent (adhesive area)
4: first laminar air-flow path
5: second laminar air-flow path
6: first atmosphere
7: second atmosphere
10 and 20: total heat exchanging element
10a: unit structure component
100: total heat exchanger

BEST MODE(S) FOR CARRYING OUT THE INVENTION

A total heat exchanging element and a total heat exchanger according to exemplary embodiments of the present invention are below described in detail with reference to the attached drawings. The present invention is not limited by the embodiments.

First Embodiment

FIG. 1 is a perspective view of a structure of a total heat exchanging element of the present invention. As shown in FIG. 1, a total heat exchanging element 10 includes the first laminar air-flow paths 4 and 4, the second laminar air-flow paths 5 and 5, the sheet-like partitioning component 1, and the corrugated-sheet-like spacing component 2. The second laminar air-flow paths 5 and 5 are layered between upper and lower first laminar air-flow paths 4 and 4 and they are perpendicular to the first laminar air-flow paths 4 and 4. The partitioning component 1 partitions between a first laminar air-flow path 4 and a second laminar air-flow path 5. The spacing component 2 forms the first air-flow path and the second air-flow path and maintains a space between a lower one of the partitioning component 1 and an upper one of the partitioning component 1. The adhesive agent 3 adheres the partitioning component 1 to the spacing component 2. The first atmosphere 6 flows through the first laminar air-flow path 4. The second atmosphere 7 flows through the second laminar air-flow path 5. The total heat exchanging element 10 causes exchange of latent heat and sensible heat between the first atmosphere 6 and the second atmosphere 7, with the partitioning component 1 as a medium. In the first embodiment, the spacing component 2 is in the form of a corrugated sheet. However, as long as the spacing component 2 can maintain a predetermined space between the partitioning component 1 and the partitioning component 1, the spacing component 2 can be, for example, a sheet folded into a rectangular wave shape or a triangular wave shape, plural pieces of boards, or the like.

Figure 4:
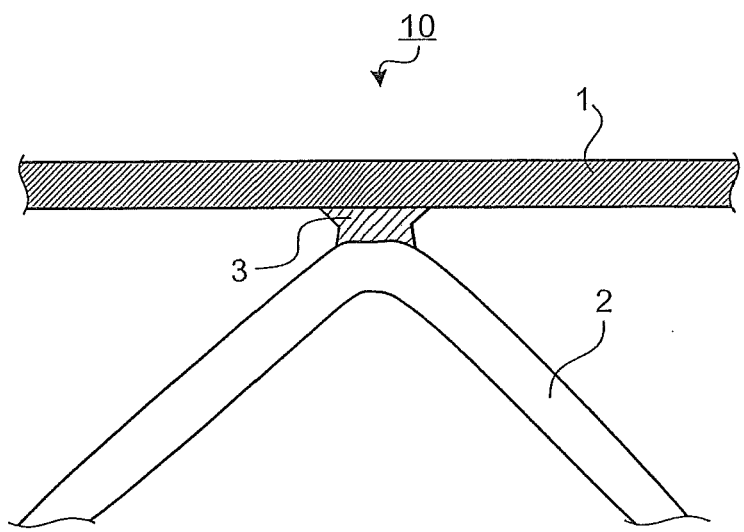
FIG. 4 depicts an enlarged cross-sectional view of an adhesive area of a partitioning component and a spacing component according to a first embodiment.

FIG. 4 is an enlarged cross-sectional view of an adhesive area of the partitioning component 1 and the spacing component 2 according to the first embodiment. The partitioning component 1 is a specially-processed paper serving as a porous, liquid-absorbing material having a maximum weight of approximately 20 g/m², formed by grinding and processing cellulose fiber (pulp) so that an air-permeability equal to or more than 200 s/100 cc is ensured. Approximately 4 g/m² of lithium chloride that is water soluble and deliquescent is added to the specially-processed paper as the moisture-absorbing agent. A non-woven fabric serving as the porous, liquid-absorbing material can be used as the partitioning component 1. Furthermore, it is allowable to add a flame-retardant agent to the partitioning component 1.

The spacing component 2 is a white-colored high-quality paper that is glossy on one side. The high-quality paper serves as a porous, liquid-absorbing material having a maximum weight of approximately 40 g/m². As long as the partitioning component 1 and the spacing component 2 are made from a material having liquid-absorbency, i.e., that can absorb both the water in the adhesive agent and the moisture-absorbing agent impregnating the water during adhesion, a flame-retardant paper to which the flame-retardant agent has been added can also be used. Furthermore, it is allowable to add the above-described water-soluble moisture-absorbing agent to the spacing component 2 in advance.

The material forming the partitioning component 1 and the spacing component 2 is preferably a material that can widely disperse an aqueous solution absorbed into the components. For example, a material that is a non-liquid-absorbent material and a liquid-absorbent material bonded together of which only one surface has liquid absorbency can be used. Alternatively, a material of which both sides have liquid-absorbency can be used. However, quick liquid absorption and dispersion to the insides of the components can be performed if the both sides have liquid-absorbency. Therefore, it is more preferable that the both sides have liquid-absorbency. When the flame-retardant paper is used as the material, the moisture-absorbing agent and the flame-retardant agent come into contact within the component. Therefore, the moisture-absorbing agent to be added and the flame-retardant agent react. Confirmation that respective functions will not deteriorated is required.

A vinyl acetate emulsion adhesive (40% solid content) serving as the water-solvent-type adhesive agent having water as a main solvent was used as the adhesive agent adhering the partitioning component 1 and the spacing component 2.

In the present invention, the water-solvent-type adhesive agent is impregnated with the water-soluble moisture-absorbing agent in advance. As the water-soluble moisture-absorbing agent impregnating the water-solvent-type adhesive agent in advance, in addition to lithium chloride that is an alkali metal salt, there are calcium chloride that is an alkali earth metal salt, urea, algic acid, alginate, thickening polysaccharides such as carrageenan, and the like. Algic acid, alginate, and thickening polysaccharides are produced from seaweed and the like. According to the first embodiment, lithium chloride is used. Lithium chloride is the same moisture-absorbing agent as the water-soluble moisture-absorbing agent added to the partitioning component 1.

If the water-solvent-type adhesive agent is adhered to the partitioning component 1 when the water-soluble moisture-absorbing agent added to the partitioning component 1 and the water-soluble moisture-absorbing agent impregnating the water-solvent-type adhesive agent are the same, both water-soluble moisture-absorbing agents become aqueous solutions in which the water-soluble moisture-absorbing agent is dissolved. Furthermore, because the adhesive agent is impregnated with the water-soluble moisture-absorbing agent, a difference in concentrations of the aqueous solutions is small. Through the effect, the spillage of the water-soluble moisture-absorbing agent from the partitioning component 1 can be prevented. As a result, the moisture-permeability that has been lost because of the spillage phenomenon can be recovered. The humidity exchange rate and the total heat exchange rate can be enhanced. A difference in both rates in the high-humidity environment and in the low-humidity environment can be reduced.

Lithium chloride has water solubility. Therefore, the addition to the vinyl acetate emulsion adhesive was performed by the lithium chloride being directly infused into the vinyl acetate emulsion adhesive and thoroughly stirred until the lithium chloride dissolved.

As the adhesive agent, other resin (vinyl acetate, vinyl acetate-acrylate ester copolymer, ethylene-vinyl acetate copolymer [EVA], acrylate-vinyl acetate copolymer, and the like) emulsion-dispersion-type adhesive agents can be used. A water-soluble polymer resin, such as polyvinyl alcohol (PVA) and polyacrylic acid (PAA), can also be used.

However, the solvent in the aqueous solution or, in other words, adhesive elements may coagulate (salting-out) when the lithium chloride is added, and deposits may occur. When the deposits occur, the deposits become an obstruction in the application of the adhesive agent. Moisture-absorbing effects may not manifest as expected. In addition, the adhesive agent itself absorbs moisture, and adhesive agent resin and water are constantly in contact. Therefore, for example, an adhesive agent in which a cross-linking reaction occurs upon completion of adhesion or an emulsion adhesive of a grade having water-resistant property in which re-emulsion caused by water is minimal is preferably used.

When the polymer resin is used, the cross-linking reaction having a water-resistant property is induced after completion of adhesion. Alternatively, molecular mass is made as large as possible to prevent re-dissolution into the water. Furthermore, when the lithium chloride is directly dissolved into the adhesive agent, a temperature of the adhesive agent may rise because of heat caused by dissolution of the lithium chloride. Therefore, when high-temperature stability of the resin adhesive agent is unstable, the lithium chloride is gradually dissolved while cooling the adhesive agent. Moreover, lithium chloride powder can first be dissolved in water and combined with the adhesive agent as a impregnated solution after a temperature of the impregnated solution is reduced.

Figure 5:
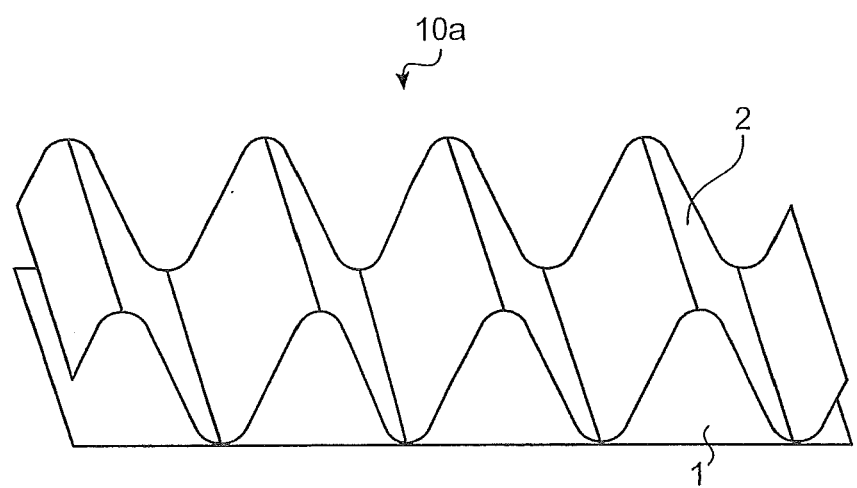
FIG. 5 is a perspective diagram of a unit structure component of a total heat exchanging element of the present invention.

The partitioning component 1 and the spacing component 2 are adhered using the above-described water-solvent-type adhesive agent 3, and the total heat exchanging element 10 is produced. In a production of the total heat exchanging element 10, first, a unit structure component 10a including one sheet of the partitioning component 1 and one sheet of the spacing component 2, such as that shown in FIG. 5, is produced by a corrugation processing machine for processing single-face corrugated fiberboards or the like. The water-solvent-type adhesive agent 3 is applied to an edge of the spacing component 2 of the unit structure component 10a, using a roll coater. Then, a next unit structure component 10a is rotated by 90°, placed on top, and adhered. Then, a next unit structure component 10a is placed on top and adhered, thereby producing the total heat exchanging element such as that shown in FIG. 1.

Second Embodiment

Figure 6:
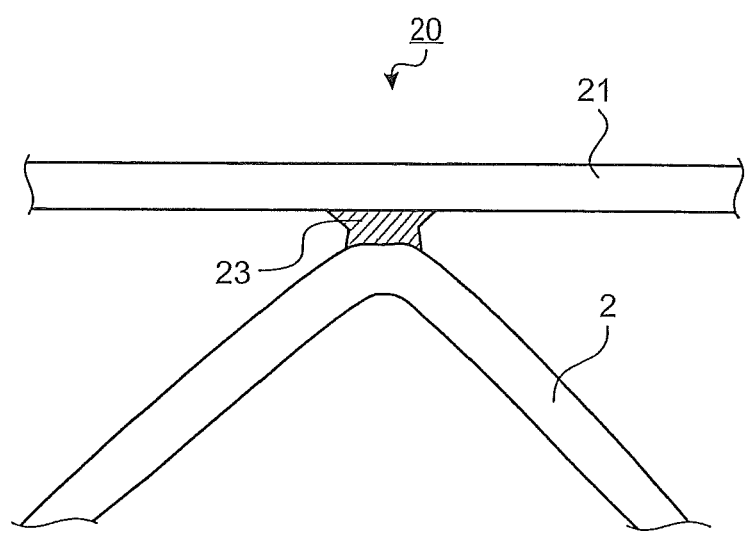
FIG. 6 is an enlarged cross-sectional view of an adhesive area of a partitioning component and a spacing component according to a second embodiment.

FIG. 6 is an enlarged cross-sectional view of the adhesive area of the portioning component 1 and the spacing component 2 according to the second embodiment. The partitioning component 21 uses the specially-processed paper having a maximum weight of approximately 20 g/m$^2$. The specially-processed paper is formed so that an air-permeability equal to or more than 200 s/100 cc is ensured. The specially-processed paper is used as is, without the addition of the water-soluble moisture-absorbing agent.

The spacing component 2 is a white-colored high-quality paper that is glossy on one side, having a maximum weight of approximately 40 g/m$^2$, as according to the first embodiment. An adhesive agent 23 is the vinyl acetate emulsion adhesive impregnated with lithium chloride. When impregnating, an added amount is adjusted so that an amount of impregnated lithium chloride is a total amount of an amount of lithium chloride added to the partitioning component 1 according to the first embodiment and an amount of lithium chloride impregnating the adhesive agent 3 according to the first embodiment. Various changes can be made in components (materials), additives (agents), assembly methods, and the like used in a total heat exchanging element 20, as in the first embodiment.

If the total heat exchanging element 20 is produced using a reverse-saturation effect of the water-soluble moisture-absorbing agent from the water-solvent-type adhesive agent 23 to the partitioning component 21, by applying a water-solvent-type adhesive agent that is impregnated with the water-soluble moisture-absorbing agent including an amount of the partitioning component 21 to the partitioning component 21, without the water-soluble moisture-absorbing agent being added to the partitioning component 21 in advance, and adhering the spacing component 2, the total heat exchanging element 20 having a same moisture-absorbing performance as when the water-soluble moisture-absorbing agent is added to the partitioning component 21 in advance can be produced. As a result, a step of adding the water-soluble moisture-absorbing agent to the partitioning component 21 can be omitted. Therefore, deterioration of operability, such as the partitioning component 21 softening during assembly, can be prevented. Manufacturing efficiency of the total heat exchanging element can be enhanced.

An agent other than the water-soluble moisture-absorbing agent, such as the flame-retardant agent, can impregnate the water-solvent-type adhesive agent in addition to the water-soluble moisture-absorbing agent and be dispersed in the portioning component 21 and the spacing component 21, if the agent is water soluble and not reactive with the water-soluble moisture-absorbing agent and the water-solvent-type adhesive agent. As a result, a step of adding the flame-retardant agent to the partitioning component 21 and the spacing component 2 becomes unnecessary. In this way, if the total heat exchanging element 20 is produced by the water-solvent-type adhesive agent being impregnated by a water-soluble agent other than the water-soluble moisture-absorbing agent, of which a purpose is to obtain some sort of an effect by impregnating the partitioning component 21 and the spacing component 2, significant labor-saving can be achieved.

[Total Heat Exchanger]

Figure 7:
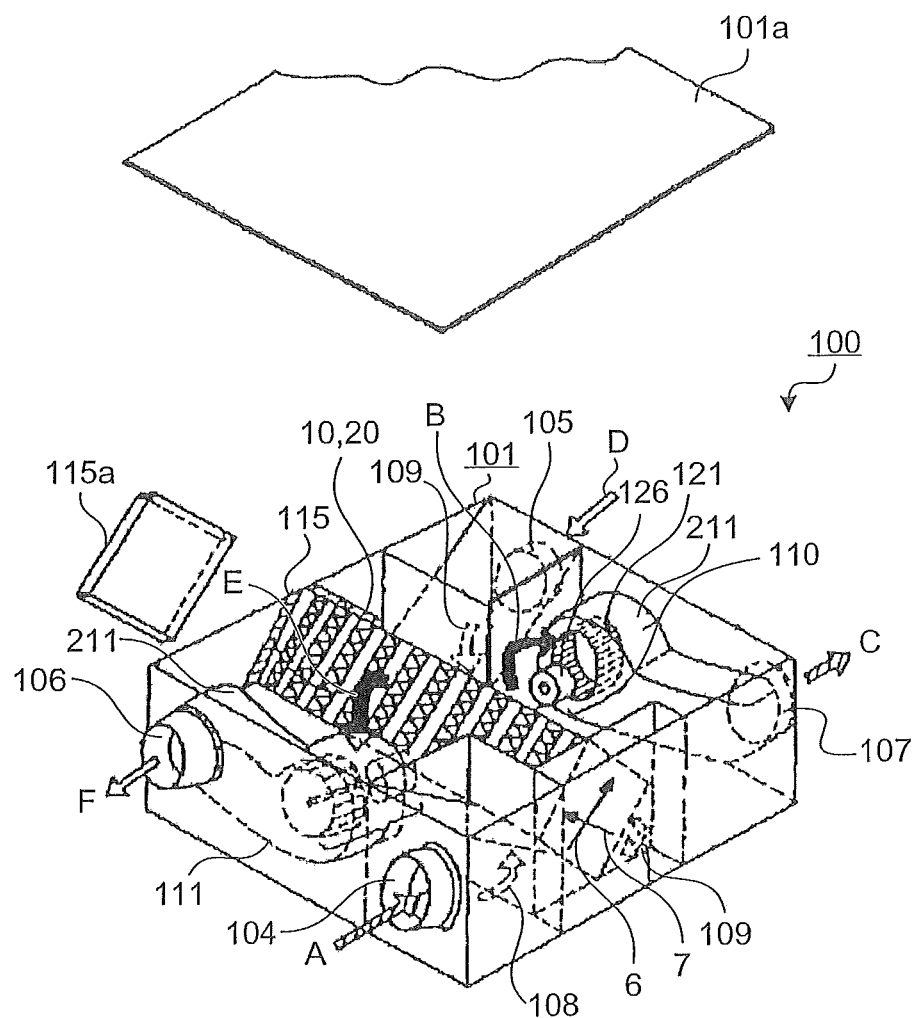
FIG. 7 is a perspective view of a state in which a top plate of a total heat exchanger incorporating the total heat exchanging element of the present invention is removed.

FIG. 7 is a perspective view of a total heat exchanger 100 that includes the total heat exchanging element 10 and the total heat exchanging element 20 of the present invention, from which a top plate 101a has been removed. The total heat exchanger 100 of the present invention is housed within a rectangular enclosure 101 including the removable top plate 101a. On one side surface of opposing side surfaces of the enclosure 101, an inlet 104 and an outlet 106 on an interior side are provided. On another side surface, an inlet 105 and an outlet 107 on an exterior side are provided. Communication between the inlet 105 and the outlet 107 and communication between the inlet 104 and the outlet 106 are respectively provided by an exhaust passage 108 and an air-supply passage 109. The exhaust passage 108 and the air-supply passage 109 are removably housed within the enclosure 101.

A fan 110 is provided within the exhaust passage 108. The fan 110 includes a bladed wheel 121, an electric motor 126, and a casing 211. The fan 110 exhausts air from an interior to an exterior from the outlet 107. A fan 111 is provided within the air-supply passage 109. The fan 111 includes the bladed wheel 121, the electric motor 126, and the casing 211. The fan 111 supplies air from the exterior to the interior from the outlet 106.

The total heat exchanging element 10 and the total heat exchanging element 20 of the present invention are inserted from an insertion opening 115 provided on the other side surface of the enclosure 101. The total heat exchanging element 10 and the total heat exchanging element 20 are provided in an intermediate section of the exhaust passage 108 and the air-supply passage 109 so that the first laminar air-flow path 4 (see FIG. 1) is communicated with the exhaust passage 108 and the second laminar air-flow path 5 (see FIG. 1) is communicated with the air-supply passage 109. After the insertion of the total heat exchanging element 10 and the total heat exchanging element 20, the insertion opening 115 is sealed by a cap 115a.

When respective fans 110 and 111 are operated, interior air is suctioned from the inlet 104 on the interior side, via a duct that is not shown, as indicated by an arrow A. The internal air passes through the exhaust passage 108 and the first laminar air-flow path 4 of the total heat exchanging element 10 and the total heat exchanging element 20, as indicated by an arrow B. The internal air is exhausted outside from the outlet 107 on the exterior side by the fan 110 for used for exhaust, as indicated by an arrow C.

In addition, the interior air is suctioned from the inlet 105 on the exterior side, via a duct that is not shown, as indicated by an arrow D. The internal air passes through the air-supply path 109 and the second laminar air-flow path 5 of the total heat exchanging element 10 and the total heat exchanging element 20, as indicated by an arrow E. The internal air is blown out from the outlet 106 on the interior side by the fan 111 for supplying air, as indicated by an arrow F. The internal air is supplied to the interior, via a duct that is not shown. At this time, in the total heat exchanging element 10 and the total heat exchanging element 20, a total heat exchange is performed between an exhaust flow B (first atmosphere 6; see FIG. 1 and FIG. 7) and an air-supply flow E (second atmosphere 7; see FIG. 1 and FIG. 7), via the partitioning component 1. Exhaust heat is recovered and air-conditioning load is reduced.

Conventional Example

The same partitioning component 1 and spacing component 2 as those according to the first embodiment were used. Vinyl acetate emulsion adhesive combined with an adequate amount of water was used as the water-solvent-type adhesive agent. The total heat exchanging element was produced through assembly methods and the like under same conditions as those according to the first embodiment. An applied amount of the water-solvent-type adhesive agent was adjusted so that solids content of the water-solvent-type adhesive agent to be applied is the same as that according to the first embodiment.

Comparison Example

To confirm that the water-soluble moisture-absorbing agent added to the partitioning component 1 spills because of the water-solvent-type adhesive agent, a spacing component having a same shape as that according to the first embodiment was produced from resin (polyethylene terephthalate [PET] resin) having low water absorbency. The spacing component serves as the spacing component 2. The same partitioning component 1 as that according to the first embodiment was used. A water-solvent-type pressure-sensitive adhesive was used as the adhesive agent.

The pressure-sensitive adhesive is applied to an edge of the PET resin spacing component. After the adhesive sufficiently dries and the added water evaporates, the partitioning component 1 is placed on top and contact-bonded. The unit structure component 10a, such as that shown in FIG. 5, is produced. Next, the pressure-sensitive adhesive is applied to another edge of the unit structure component 10a. After the adhesive sufficiently dries and the water evaporates, a next unit structure component 10a is rotated by 90°, placed on top, and contact-bonded, thereby producing the total heat exchanging element.

By the total heat exchanging element being produced using the PET resin spacing component, such as that described above, the water-soluble moisture-absorbing agent does not spill outside of the partitioning component 1 even when the partitioning component 1 absorbs water during element manufacturing. Through a comparison of the performance of the total heat exchanging element and that of the conventional example, it can be confirmed that the spillage of the water-soluble moisture-absorbing agent from the partitioning component 1 is caused only by the water in the adhesive agent.

Total heat exchanging elements of the same size according to the first embodiment, the second embodiment, of the conventional example, and the comparison example are produced. Values of the humidity exchange rates measured under same testing conditions (environmental conditions, air-flow conditions, measuring conditions, and the like) are shown in Table 1.

TABLE 1

| | Humidity Exchange Rate [%] | |
| --- | --- | --- |
| | During high humidity/ during low humidity (percentage of change) | Configuration |
| First embodiment | 65%/58% (90%) | Moisture-absorbing-agent-added partitioning component + moisture-absorbing-agent-impregnated adhesive agent |
| Second embodiment | 64%/58% (90%) | Moisture-absorbing-agent-impregnated adhesive agent |
| Conventional example | 56%/58% (54%) | Moisture-absorbing-agent-added partitioning component |
| Comparison example | 54%/52% (97%) | Moisture-absorbing-agent-added partitioning component + adhesive-agent-induced moisture-absorbing agent spillage prevention measure |

To measure a difference in the humidity exchange rate in the high-humidity environment and in the low-humidity environment, conditions complying with exchange rate measuring conditions (summer conditions) of Japan Industrial Standards (JIS) B8628 (total heat exchanger) are used as the high-humidity environment. Conditions complying with exchange rate measuring conditions (cooling conditions) of Air-Conditioning and Refrigeration Institute (ARI) 1060-RATING AIR-TO-AIR ENERGY VENTILATION EQUIPMENT are used as the low-humidity environment. Percentage of low-humidity area humidity exchange rate/high-humidity area humidity exchange rate is shown within the parentheses.

As shown in Table 1, both an absolute value of the humidity exchanging rate and a difference in the exchange rates in the high-humidity environment and in the low-humidity environment of the total heat exchanging elements according to the first embodiment and the second embodiment are superior to the conventional example. Although an absolute value of the humidity exchange rate in the high-humidity environment of the comparison example does not significantly differ compared to the conventional example, the humidity exchange rate in the low-humidity environment is significantly improved. This is a difference in effects caused by the spillage of the moisture-absorbing agent. According to the first embodiment, almost the same value as that of the comparison example is obtained regarding humidity exchange rate environment change. Therefore, it is clear that the spillage of the water-soluble moisture-absorbing agent from the partitioning component 1 is being prevented.

INDUSTRIAL APPLICABILITY

As described above, the total heat exchanging element according to the present invention is effective in a heat exchange ventilator performing ventilation of a building and ventilation of a mobile body, such as an automobile or a train. In particular, the total heat exchanging element is suitable for a total heat exchanger performing a total heat exchange that simultaneously exchanges latent heat and sensible heat.

The invention claimed is:

1. A total heat exchanging element comprising:
   a partitioning component that partitions between a first laminar air-flow path and a second laminar air-flow path that are layered;
   a spacing component that forms the first laminar air-flow path and the second laminar air-flow path and maintains a space between the partitioning components;
   a water-solvent-type adhesive agent that adheres the partitioning component and the spacing component; and
   a water-soluble moisture-absorbing agent included in the water-solvent-type adhesive agent, wherein
   the partitioning component is impregnated with the water-soluble moisture-absorbing agent.

2. The total heat exchanging element according to claim 1, wherein the partitioning component and the spacing component are formed from a liquid-absorbing material that absorbs water and substances dissolved in the water.

3. The total heat exchanging element according to claim 2, wherein the liquid-absorbing material is a porous material that absorbs the water and the substances dissolved in the water by capillary attraction.

4. The total heat exchanging element according to claim 3, wherein the porous material is paper made from cellulose fiber or a non-woven fabric.

5. The total heat exchanging element according to claim 1, wherein a water-soluble moisture-absorbing agent is added to the spacing component.

6. The total heat exchanging element according to claim 1, wherein a flame-retardant agent is added to the partitioning component.

7. The total heat exchanging element according to claim 1, wherein a flame-retardant agent is added to the spacing component.

8. The total heat exchanging element according to claim 1, wherein a water-soluble flame retardant agent saturates the water-solvent-type adhesive agent.

9. The total heat exchanging element according to claim 1, wherein the water-soluble moisture-absorbing agent is any one of a deliquescent alkali metal salt and a deliquescent alkali earth metal salt, or a combination thereof.

10. The total heat exchanging element according to claim 1, wherein the water-soluble moisture-absorbing agent is any one of urea, carrageenan, algic acid, and alginate, or a combination thereof.

11. The total heat exchanging element according to claim 1, wherein the water-solvent-type adhesive agent is a resin emulsion adhesive of which a main solvent is water.

12. The total heat exchanging element according to claim 1, wherein the water-solvent-type adhesive agent is a resin emulsion-dispersion-type adhesive agent of which a main solvent is water and is any one of a vinyl acetate resin emulsion adhesive, a vinyl acetate-acrylate ester copolymer resin emulsion adhesive, a acrylate-vinyl acetate copolymer resin emulsion adhesive, or a combination thereof.

13. The total heat exchanging element according to claim 1, wherein the water-solvent-type adhesive agent is an emulsion adhesive having water-resistant property.

14. A total heat exchanger comprising a total heat exchanging element that includes
- a partitioning component that partitions between a first laminar air-flow path and a second laminar air-flow path that are layered;
- a spacing component that forms the first laminar air-flow path and the second laminar air-flow path and maintains a space between the partitioning components;
- a water-solvent-type adhesive agent that adheres the partitioning component and the spacing component; and
- a water-soluble moisture-absorbing agent included in the water-solvent-type adhesive agent, wherein
- the partitioning component is impregnated with the water-soluble moisture-absorbing agent.

* * * * *